March 17, 1964 W. F. GOLDING 3,124,964
APPARATUS FOR CONVERTING OSCILLATING INTO INTERMITTENT MOTION
Filed Sept. 12, 1961 5 Sheets-Sheet 3

Inventor
William Frank Golding
by Albert Jacobs
Attorney

March 17, 1964 W. F. GOLDING 3,124,964
APPARATUS FOR CONVERTING OSCILLATING INTO INTERMITTENT MOTION
Filed Sept. 12, 1961 5 Sheets-Sheet 4

Inventor
William Frank Golding
by Albert H. Jacobs
Attorney

March 17, 1964   W. F. GOLDING   3,124,964
APPARATUS FOR CONVERTING OSCILLATING INTO INTERMITTENT MOTION
Filed Sept. 12, 1961   5 Sheets-Sheet 5

Inventor
William Frank Golding
by Albert Jacks
Attorney

United States Patent Office 3,124,964
Patented Mar. 17, 1964

3,124,964
APPARATUS FOR CONVERTING OSCILLATING
INTO INTERMITTENT MOTION
William Frank Golding, 22 Parry's Close, Stoke Bishop,
Bristol 9, England
Filed Sept. 12, 1961, Ser. No. 137,554
Claims priority, application Great Britain Sept. 26, 1960
2 Claims. (Cl. 74—88)

This invention relates to apparatus for converting oscillating into intermittent motion.

According to this invention apparatus for converting oscillating into intermittent motion comprises a planet carrier which is oscillated about its axis, a planet gear supported for rotation on said carrier, a first and a second sun gear both supported for rotation about the axis of the carrier and both meshing with said planet gear, means for preventing rotation of the first sun gear in the one direction of the oscillation of said carrier and means for preventing rotation of the second sun gear in the other direction of the oscillation of said carrier whereby the oscillation of the carrier is converted into intermittent rotation of said sun gears, said planet gear driving said first sun gear in said other direction when said carrier rotates in said other direction and driving said second sun gear in said one direction when said carrier rotates in said one direction.

One form of apparatus according to this invention will now be described as applied to a sheet feeding device in a press for working on sheets. Reference is made to the accompanying drawings wherein.

Figure 1:
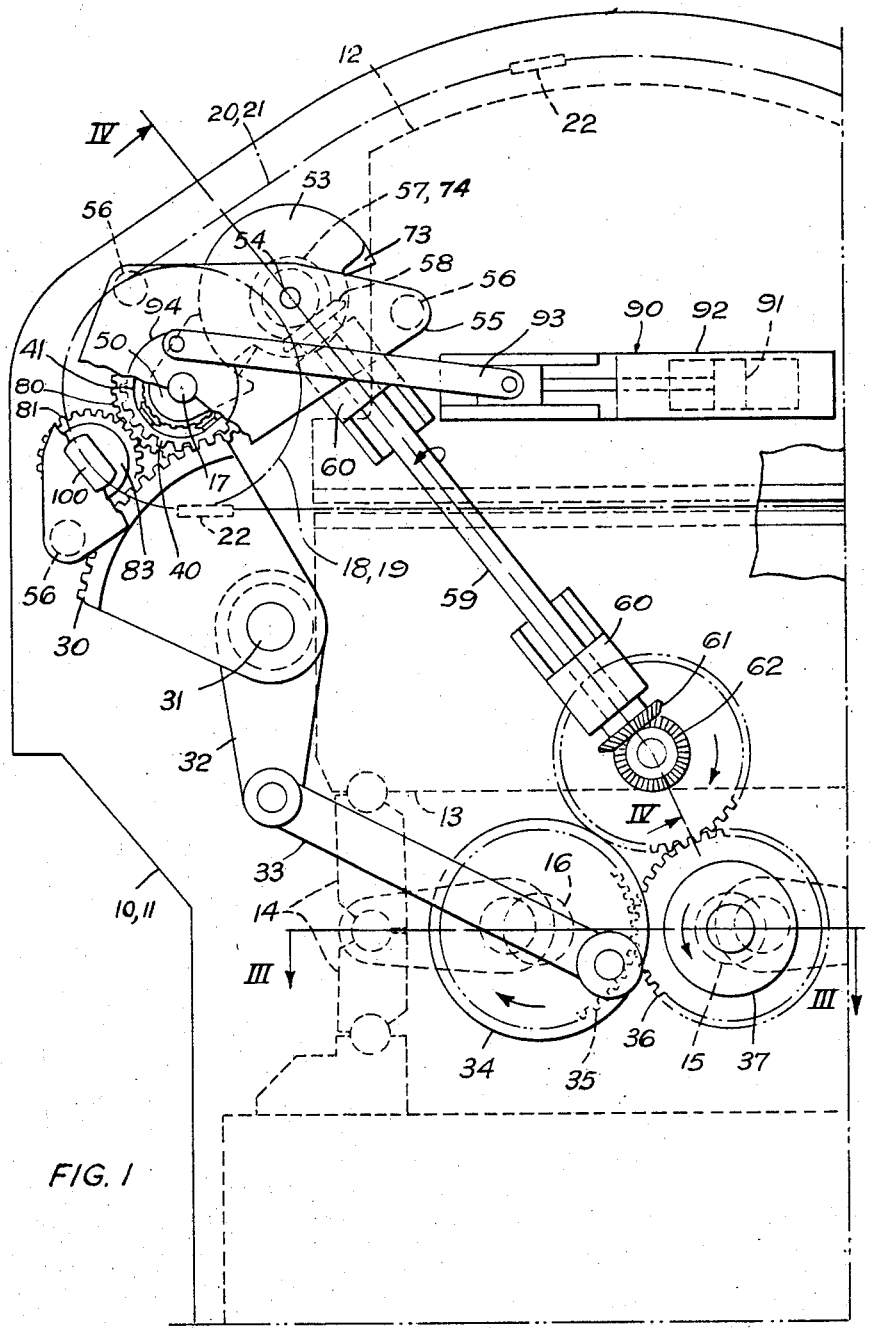
FIGURE 1 is an elevation of the apparatus and the adjacent part of the press.
Figure 2:
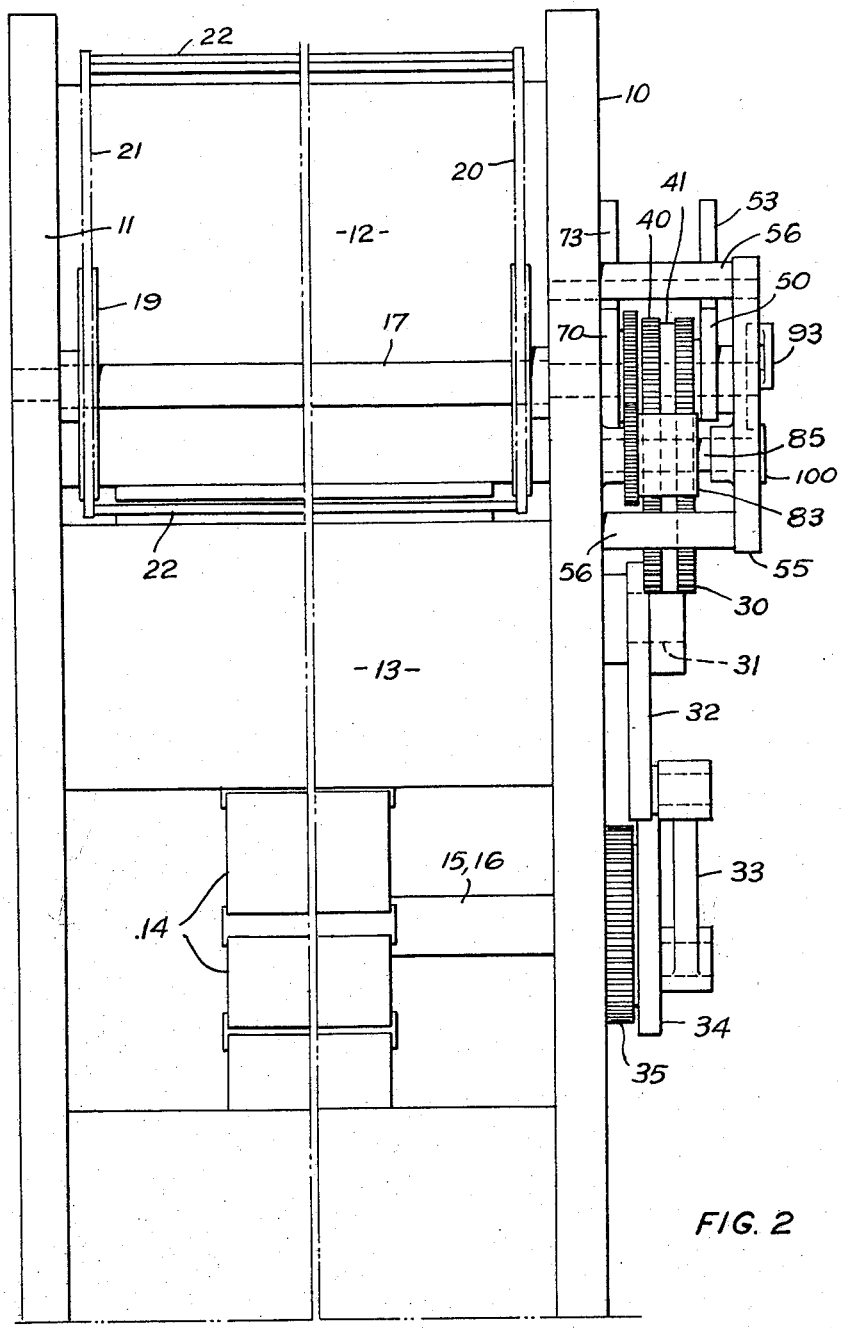
FIGURE 2 is a view in the direction of the arrow II in FIGURE 1.
Figure 3:
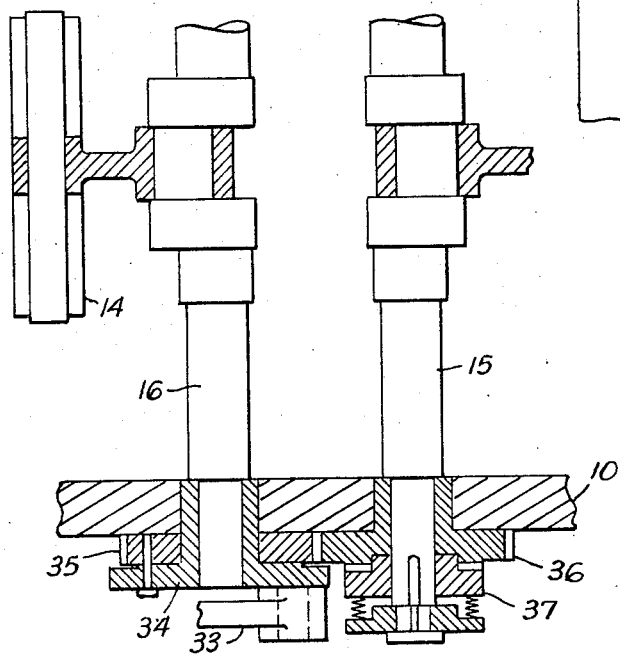
FIGURE 3 is a section on the line III—III in FIGURE 1.

The press illustrated (FIGURES 1 to 3) comprises a pair of side frames 10, 11 between which are provided a fixed platen 12 and a platen 13 which is reciprocated by toggles 14 driven by a pair of crankshafts 15, 16 which are continuously rotated and which make one revolution per cycle of reciprocation of the platen 13. The press is provided with a sheet feeding device comprising a shaft 17 extending between and supported for rotation by the frames 10, 11, the shaft 17 having secured thereto a pair of sprockets 18, 19 over which are trained a pair of endless chains 20, 21 to which are secured, at regular intervals therealong, mechanical sheet grippers 22. The sheet feeding device is required for successive grippers 22 each to engage a sheet and feed it into position between the platens 12, 13 when the latter are parted, and to hold the sheet still while the platens 12, 13 engage thereon. To this end the sheet feeding device is so proportioned that during successive whole revolutions of the shaft 17 the grippers 22 are successively moved through between the platens 12, 13 and the device is operated for such movement to take place during every other half-revolution of the shafts 15, 16, being the half-revolutions during which the platens experience their maximum separation. In other words, the shaft 17 must rotate intermittently and make one revolution during alternate half-revolutions of the continuously rotating shafts 15, 16.

The shaft 17 is driven by the shafts 15, 16 and the continuous rotation of the latter is converted into the intermittent rotation of the shaft 17 by a mechanism comprising, in the first instance, means for converting the rotation of the shafts, 15, 16, into oscillating motion of a quadrant 30 and, secondly, means for converting the oscillating motion of that quadrant into the intermittent rotation required of the shaft 17.

The quadrant 30 is supported for oscillation on a pin 31 secured to the frame 10, and to the quadrant 30 is secured an arm 32 connected by a connecting rod 33 to a crank 34 secured to a gear 35 meshing in 1:1 relationship with a gear 36 connected to the crankshaft 15 through the intermediary of an overload clutch 37. Rotation of the shaft 15 operates to oscillate the quadrant 30. As will be described, the shaft 17 is rotated when the quadrant 30 moves in the one direction of its oscillation. The quadrant is shown (FIGURES 1, 5) at the beginning of the operating stroke thereof, i.e. the stroke during which the shaft 17 is rotated, the other stroke being termed the "idle stroke."

Figure 7:
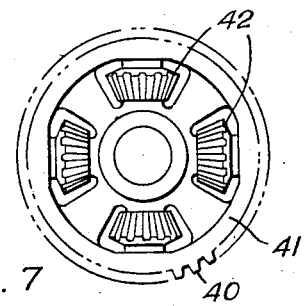
FIGURE 7 shows a detail of FIGURE 5.

The quadrant 30 meshes with a gear 40 (FIGURES 5 to 7) which is integral with a planet carrier 41 supported for rotation on the shaft 17 and provided with planet bevel gears 42 meshing with a pair of opposite sun gears 43, 44. The gear 43 is a driving gear and is secured to the shaft 17. The gear 44 is an idle gear seated for free rotation on the shaft 17. The carrier gear 40 is dimensioned for the carrier 41 to rotate exactly 180° per stroke of the quadrant 40, i.e. during each revolution of the crankshafts 15, 16 the carrier 41 makes a counter-clockwise and a clockwise half-revolution. During the counter-clockwise half-revolution of the carrier 41 (arrow 41a) the idle sun gear 44 is held against rotation with the result that the planets 42 roll thereon and rotate the sun gear 43 at twice the speed of the carrier 41, i.e. rotate the shaft 17 through 360°. During the clockwise half-revolution of the carrier 41 (arrow 41b), it is the driving sun gear 43 which is held against rotation and the sun 44 is freed for rotation to rotate idly (in the clockwise direction) under the influence of the planets 42 to accommodate the idle stroke of the quadrant 30. In brief, the oscillation of the quadrant 30 is converted into intermittent rotation of the shaft 17 by the sun gears 43 and 44 being locked against rotation during the driving and idle strokes, respectively, of the quadrant 30, and a whole counter-clockwise revolution of the shaft 17 is produced during alternate half-revolutions of the crankshafts 15, 16.

Figure 4:
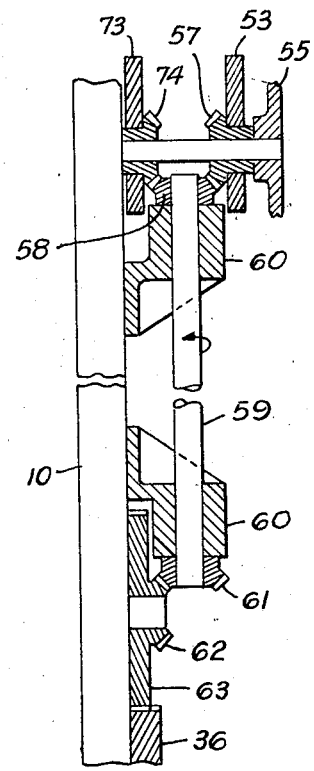
FIGURE 4 is a section on the line IV—IV in FIGURE 1.

The alternate locking of the sun gears 43, 44 is performed as follows. The sun 43 has secured thereto a locking member 50 provided with a concave surface 51 dimensioned to fit a convex arcuate periphery 52 of a locking member 53 supported for rotation on a shaft 54 extending parallel to the shaft 17 and supported between the frame 10 and a bearing plate 55 secured thereto by supports 56. The locking member 53 is secured to a bevel gear 57 (see also FIGURES 1, 4) meshing with a bevel gear 58 secured to one end of a shaft 59 supported in bearings 60 secured to the frame 10 and connected at the other end through bevel gears 61, 62 to a gear 63 meshing with the gear 36 which, as stated, is driven by the crankshaft 15. The connection is such that the locking member 53 is rotated continuously at the same speed as the shaft 15 and in the clockwise direction (arrow 53a), i.e. the direction opposite to that in which the sun 43 is rotated during the driving stroke of the quadrant 30. Engagement between the periphery 52 and the concave surface 51 operates to lock the member 50 and with it the sun gear 43 against rotation in either direction, and the periphery 52 is dimensioned for such engagement to terminate when the sun gear 43 is to resume rotation, and to commence when the sun gear 43 is to stop. The operation of the locking means defined by the members 50, 53 is discussed further later hereinbelow.

Meanwhile, it is explained that the sun gear 44 is provided with a similar locking means in that it has secured thereto a locking member 70 provided with a concave surface 71 dimensioned to fit a convex arcuate periphery of a locking member 72 supported for rotation on the shaft 54 and connected by a bevel gear 74 to the bevel gear 58 to be driven thereby continuously at the same speed as that of the member 53 but in the counterclockwise direction (arrow 73a), i.e. the direction opposite that in which the sun 44 is rotated during the idle stroke of the quadrant 30.

Additionally, the sun gear 44 has secured thereto a gear 80 meshing with a gear 81 integral with an outer or movable part 82 of a one-way detent 83 the inner or fixed part 84 of which is secured to a sleeve 85 supported between the frame 10 and the bearing plate 55 and secured to the latter. The detent 83 is arranged to prevent counter-clockwise rotation of the sun 44, whose rotation, when occurring, is of course only clockwise. Although the members 70, 73, when engaged, prevent rotation of the sun 44 in either direction, the detent 83 is introduced to aid in sustaining certain particularly heavy forces occurring, as will be seen, on the sun 44 in the counterclockwise direction during the locking period of the members 70, 72.

Figure 5:
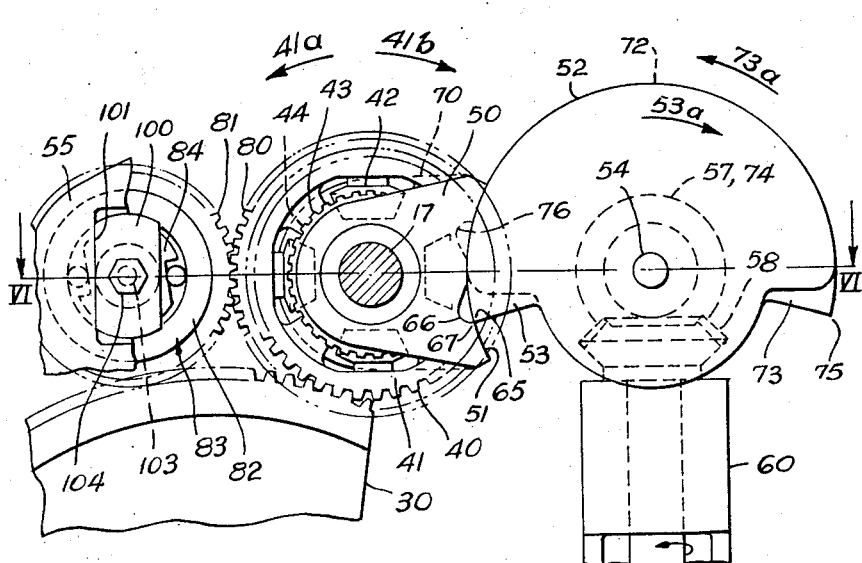
FIGURE 5 shows a part of FIGURE 1 to an enlarged scale.
Figure 9:
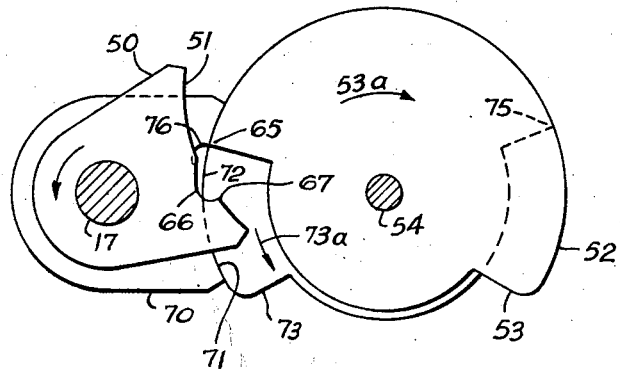
FIGURES 9 to 11 show different operational positions of certain parts shown in FIGURE 5.
Figure 10:
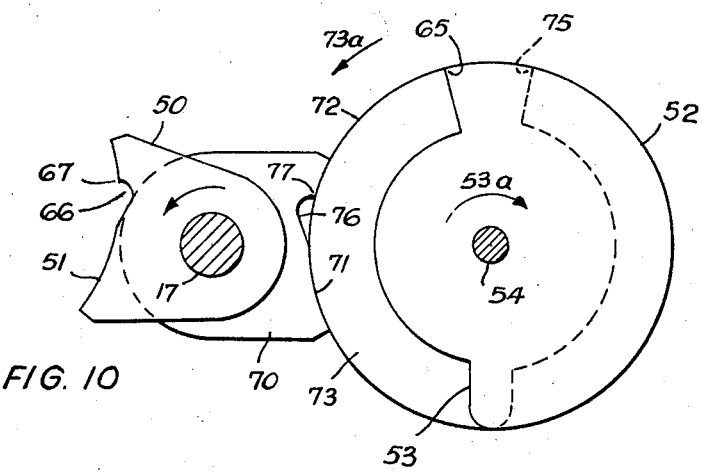
Figure 11:
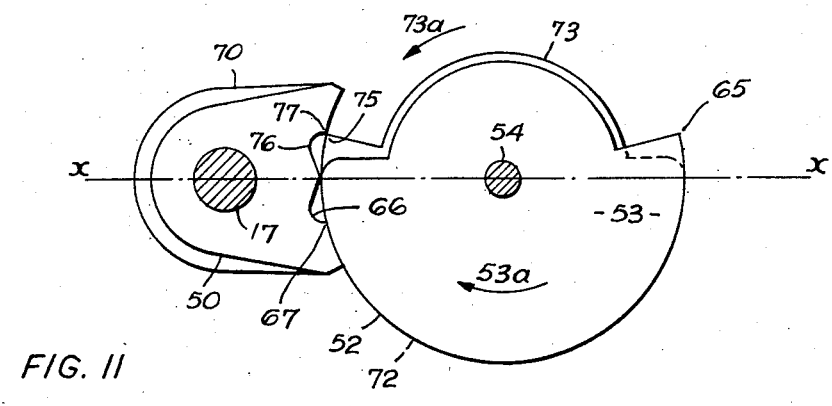

The members 50, 53, and 70, 73 co-operate as follows. As stated, FIGURE 5 shows the position at which the quadrant 30 starts its driving stroke. In this position, the members 50, 53 start moving away from each other in their opposite directions of rotation. At the same time the members 70, 73 commence their engagement. FIGURE 9 shows the position of the members 50, 53 and 70, 73 a short period after the start of the driving stroke of the quadrant 30 and FIGURE 10 shows the position of these members after 90° of rotation of the members 53, 73, i.e. substantially at the end of the acceleration phase of quadrant 30. During that phase the forces necessary to accelerate the shaft 17, chains 20, 21 and grippers 22 tend to rotate the sun gear 44 in the counter-clockwise direction and the detent 83 provides the necessary reaction. This is particularly important at the commencement of the driving stroke when acceleration is a maximum and the members 70, 73 are not yet in sufficient engagement to prevent counter-clockwise rotation of the sun gear 44 as is clear from FIGURE 5. On deceleration, i.e. substantially during the second half of the driving stroke, the shaft 17 may tend to over-run the drive with the effect of the sun gear 44 tending to rotate in the clockwise direction which is of course prevented by the members 70, 73. As shown in FIGURE 11, after 180° of rotation of the members 53, 73, i.e. at the end of the driving stroke, the member 50 engages the member 53 to stop the sun gear 43 and thus the shaft 17, while the members 70, 73 disengage to free the sun gear 44 for the idle run thereof. During the idle stroke the members 50, 53 and 70, 73 return to the FIGURE 5 position and the cycle of their operation is completed.

Figure 6:
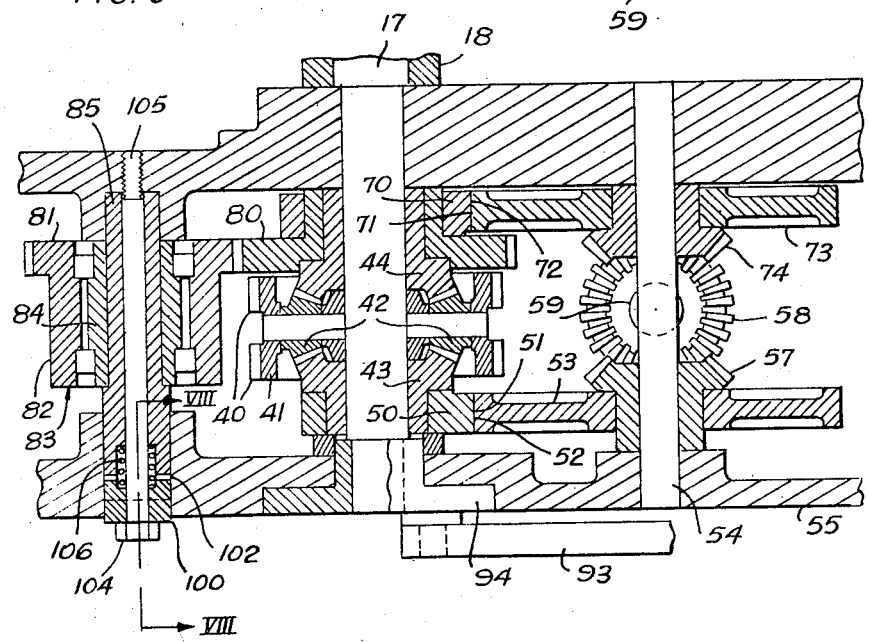
FIGURE 6 is a section on the line VI—VI in FIGURE 5.

Said tendency to over-running of the shaft 17 during the deceleration phase of the driving stroke is minimized by means of a fluid pressure brake 90 (FIGURE 1) comprising a piston 91 situated in a cylinder 92 secured to the frame 10 and connected through a connecting rod 93 to a crank 94 secured to the shaft 17 (see also FIGURE 6). The brake 90 is set for the piston 91 thereof to compress fluid in the cylinder 92 during said deceleration phase to absorb the inertia forces acting on the shaft 17 and relieve the locking members 70, 73. Also, the brake 90 operates to bring the shaft 17 to rest smoothly to minimise any impact between the members 50, 53 when the latter enter the FIGURE 10 position, i.e. the position when the shaft 17 is positively arrested by the concave portion 51 of the member 50 abutting the periphery 52 of the member 53.

It will be seen that by means of the detent 83 and the brake 90 the loads on the locking members 70, 73 are virtually removed, but the latter members still serve the function of timing the shaft 17, i.e. of preventing positively any out of phase rotation of the shaft 17 in the counter-clockwise direction during the drive stroke. Such out of phase rotation would tend to rotate the locking member 70 in the clockwise direction, and to prevent such clockwise rotation right up to the end of the drive stroke the periphery 72, which must hold the member 70 during 180° of rotation of the member 73, is made greater than 180° by being extended to a corner 75. In FIGURE 11, which shows the members 70, 73 at the end of the drive stroke, a line x—x extending through the centers of the shafts 17, 53 defines said 180° of the periphery 72, and it is clear that the corner 75 must lie above the line x—x to provide resistance to clockwise rotation of the member 70. A recess 76 in the concave surface 71 provides clearance for the corner 75 when the members 70, 73 resume rotation at the commencement of the idle stroke. A corner 77 of the recess 76 defines the last point of contact between the members 70, 73 at the end of the drive stroke.

Conditions similar to those making necessary the provision of the corner 75 arise in respect of the members 50, 53 at the end of the idle stroke (FIGURE 5). To prevent counter-clockwise rotation of the member 50 right to the very end of the idle stroke, the periphery 52 is extended to a corner 65 lying beyond the 180° defined by the line VI—VI in FIGURE 5, and the surface 51 is provided with a clearance recess 66 having a corner 67 defining the last point of contact between the members 50, 53 at the end of the idle stroke.

Figure 8:
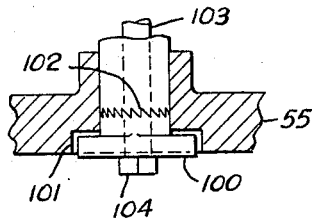
FIGURE 8 is a section on the line VIII—VIII in FIGURE 6.

It is sometimes necessary, for example during the building or servicing of the press, to rotate the crankshafts 15, 16 backwards with the effect that, if the quadrant 30 is in the idle stroke position, the sun gear 44 and locking member 70 are rotated in the counter-clockwise direction. Since such counter-clockwise rotation would be prevented by the detent 83, means are provided for releasing the detent 83. Those means comprise a key 100 (FIGURES 5, 6, and 8) seated in a recess 101 in the bearing plate 55 and connected by teeth 102 to the adjacent end of the sleeve 85, the key 100 thus operating to secure the sleeve 85 against rotation to the plate 55. The teeth 102 are held in engagement by a screw 103 extending through the key 100 and sleeve 85. At one end screw 103 is provided with a head 104 engaging the key 100, and at the other end, 105, the screw 103 is threaded into the frame 10 (FIGURE 6). When the screw 103 is released a compression spring 106 provided between the sleeve 85 and key 100 forces the latter away from the former with the effect of disengaging the teeth 102 and releasing the detent 83 to make possible counter-clockwise rotation of the sun gear 44.

It will be seen that the basic requirements for the operation of the mechanism are means to prevent counter-clockwise rotation of the sun gear 44 and means to prevent clockwise rotation of the sun gear 43. As described, a counter-clockwise rotation of the sun gear 44 is prevented by the detent 83, and it is noted in this connection that another such detent could be used to prevent clockwise rotation of the sun gear 43.

Next, inasmuch as it is necessary to prevent the shaft 17 from over-running the carrier 41 during the decelerating phase of the drive stroke, there is introduced the brake 90. Inasmuch as there may be a small inertia force tending to cause over-running of the sun gear 44 during the deceleration phase of the idle stroke, this could be dealt with by a brake which may be similar to the brake 90. The locking members 50, 53 and 70, 73 may then be regarded as an additional refinement for positive control of timing, especially the positive control against over-run. Thus, even when the apparatus stands still it would not be possible, say during the building or servicing of the press, to rotate the shaft 17 in the counter-clockwise direction.

As afore-mentioned, a one-way detent and a brake may be provided respectively for the sun gears 43 and 44. But where the inertia forces on the idle sun gear 44 are small or insignificant, as is the case in the illustrated arrangement, the locking members 50, 53 and 70, 73 are for normal purposes sufficient to deal with such inertia forces and need not be supplemented by a one-way detent for the gear 43 and a brake for the gear 44.

What I claim and desire to secure by Letters Patent is:

1. Apparatus for converting oscillating into intermittent motion comprising a planet carrier, means for oscillating said carrier about its axis, a planet gear supported for rotation on the carrier, a first and a second sun gear both supported for rotation about the axis of said carrier and both meshing with said planet gear, means for preventing rotation of said first sun gear when said carrier moves in the one direction of its oscillation and preventing rotation of said second sun gear when the carrier moves in the other direction of its oscillation, said planet gear co-operating to drive said first sun gear when said carrier moves in said other direction and to drive said second sun gear when said carrier moves in said one direction; said rotation-preventing means comprising in respect of at least one of said sun gears a locking member, means for continuously rotating said locking member, said locking member being dimensioned to engage said at least one sun gear to prevent rotation thereof at least in the direction in which said at least one sun gear moves when driven by said planet.

2. Apparatus for converting oscillating into intermittent motion comprising a planet carrier, means for oscillating said carrier about its axis, a planet gear supported for rotation on said carrier, a first and a second sun gear both supported for rotation about the axis of the carrier and both meshing with said planet gear, means for preventing rotation of the first sun gear when the carrier moves in the one direction of its oscillation and means for preventing rotation of the second sun gear when the carrier moves in the other direction of its oscillation; said rotation-preventing means comprising in respect of at least one of said sun gears a first locking member secured to said at least one sun gear, a concave arcuate surface provided on said first locking member, a second locking member supported for rotation about an axis parallel to that of the carrier, a convex arcuate surface provided on said second locking member concentrically with the axis of rotation thereof, means for rotating said second locking member about said axis thereof and in timed relationship with the oscillations of said carrier, said concave surface being dimensioned to engage said convex surface at the end of each rotation of said at least one sun gear and said concave and convex surfaces when thus engaged co-operating to lock said at least one sun gear against rotation, said second locking member being so dimensioned and said timed relationship being such that during rotation of said second locking member said convex surface is in a position to be engaged by said concave surface when said at least one sun gear stops at the end of its rotation and to disengage from said concave surface when said at least one sun gear resumes rotation.

References Cited in the file of this patent

UNITED STATES PATENTS

| 1,050,713 | Atkins | Jan. 14, 1913 |
| 1,283,661 | Carlson | Nov. 5, 1918 |
| 2,421,188 | Derungs | May 27, 1947 |

OTHER REFERENCES

"Rocking Differential Provides Momentary Dwell for Bonding Cycle," from Machine Design, January 7, 1960, pages 136–138.